July 25, 1939.  G. ERBER  2,167,565
METHOD OF CONNECTING THE ELECTRODES IN AUTOMATIC ELECTRIC ARC WELDING
Filed Nov. 6, 1937
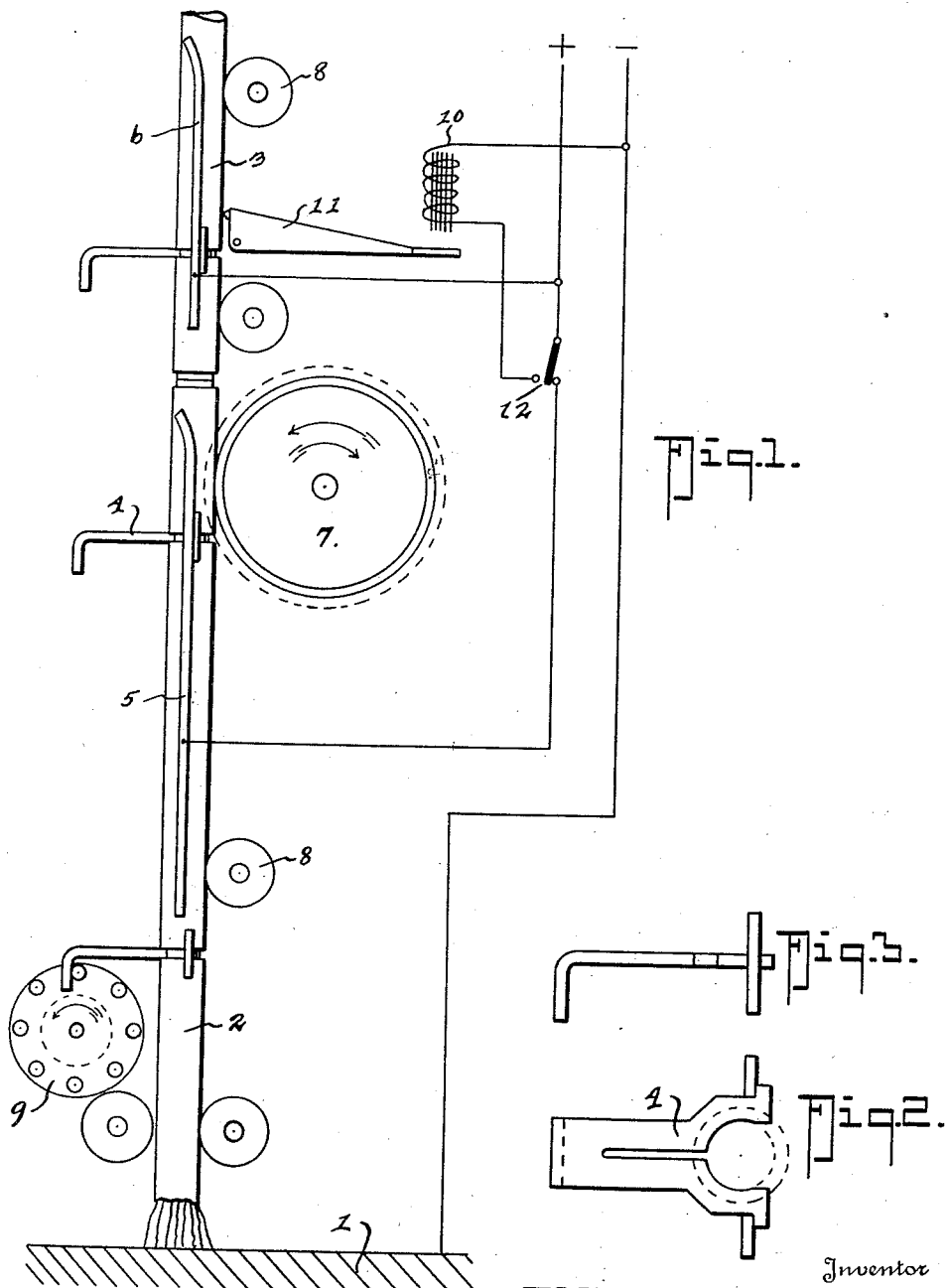
Inventor
GUNTER ERBER
By B. Singer
Attorney Patented July 25, 1939

2,167,565

UNITED STATES PATENT OFFICE 2,167,565

METHOD OF CONNECTING THE ELECTRODES IN AUTOMATIC ELECTRIC ARC WELDING

Günter Erber, Weiz, Steiermark, Austria, assignor to Elin A. G. für elektrische Industrie, Vienna, Austria, a corporation of Austria Application November 6, 1937, Serial No. 173,170
In Austria November 30, 1936

10 Claims. (Cl. 219—8)

This invention relates to the interconnecting of the electrodes in automatic electric arc welding. In automatic electric arc welding interruptions due to changing the electrodes, or to passing from one electrode to the next, must be avoided if a uniform seam is to be obtained. Thin electrodes may be produced in considerable lengths and rolled up into rings for use, but this is not possible in the case of thicker electrodes. The normal electrodes supplied in the form of short rods must therefore be successively connected up together during the welding process in such a manner as not to interrupt this process. The proper fulfillment of this purpose is of particular importance in the case of automatic welding with the use of covered electrodes.

The connection or union formed for this purpose must be mechanically resistant (even at higher temperatures), so that it does not become disconnected by the unavoidable strains involved in advancing the electrode up to the work and in feeding the welding current thereto; it must also afford no appreciable resistance to the passage of current, since otherwise the voltage of the arc might drop temporarily below the figure for which the regulator is set; it must not contain any metal of a substantially different composition from that of the electrode itself nor involve the removal of any covering on the electrode; and finally it must not require as far as possible any mechanical machining of the electrodes, and the establishing of the connection between the electrodes should not divert the welder's attention from the welding work.

Hitherto the interconnecting of rod electrodes for the purposes of automatic electric arc welding has been effected by means of screw joints, cylindrical or tapered spigot joints, or ferrules. These types of joints, however, are without exception expensive. It has also been proposed to interconnect the electrode rods by welding, for instance by resistance welding or electric arc welding, separate welding current sources being required in either case for the purpose of effecting such welded joints between the electrodes.

In accordance with the invention the interconnecting of welding rods for automatic electric arc welding is effected by arc welding, and that with the aid of the same welding current as flows through the electrodes themselves, by means of a second arc connected for a short time in series with the welding arc proper. This secondary arc is struck between the two electrode ends to be joined together, for which purpose the current may if desired or necessary be diverted through a provisional contact.

For the purpose of striking the arc there is preferably utilized the advancing movement of the electrode being welded at the time, by causing the next following electrode to be prevented, for a brief space of time after the closing of the said contact, from participating in or following the movement of the preceding electrode. It may also be convenient, within the scope of the method according to the invention, to weld in between the ends of the electrodes thus welded together pins, chaplets, sleeves, ferrules, or the like elements which may also be arranged, provided they extend beyond the contour of the electrode covering, to serve as intermediaries in effecting the advancing of the electrode up to the work or the feeding of current to the electrode. In order to ensure welding the consecutive electrode rods together in accurate alignment the current feeding parts are at the same time used as guide members and guide tracks. If this should not prove possible separate guide rails or sleeves are provided for this purpose, more particularly in the neighbourhood of the point at which the interconnecting of the electrodes is to be carried out.

Since the metal of the electrodes is fused at the joint a connection is obtained which is mechanically and electrically equivalent to the full core of the electrode, without the necessity for any mechanical machining. The covering composition is only removed to such an extent that it does not hinder the welding together of the ends. No interruption in the covering which is noticeable in the welding operation proper results from this cause.

Fig. 1 is a diagrammatic elevation illustrating the invention.

Fig. 2 is a plan view on an enlarged scale of one of the slotted contact elements.

Fig. 3 is an edge view of the same.

Fig. 1 of the accompanying drawing shows a welding device diagrammatically, for using covered electrodes, as an example of the application of the invention, 1 denoting the work, 2 the electrode being used in the welding operation, and 3 the next following electrode to be united to the electrode 2. The current is fed to the electrodes with the aid of slotted contact elements 4 (shown on an enlarged scale in Fig. 2) which are fitted to optionally spaced bared places on the electrode, and which brush against conductor rails 5 and 6. These contact elements serve at the same time to hold the metal core of the electrode at a constant distance from the conductor rails irrespective of unevennesses in the thickness of the covering, so that the two electrodes to be joined together are always in axial alignment. After clearing the lower conductor rail 5 the contact elements 4 are detached by hand or mechanically (for instance by a revolving peg wheel 9) from the electrode. The advancing of the electrodes is effected for example by means of the rubber-covered or milled edge friction wheel 7 driven in a manner known per se, or by positive engagement and driving of the current feed plates 4. Fixedly, adjustably, or resiliently mounted guide rollers 8 keep the electrodes in position. The current feed rail 6 is permanently connected to the source of current, while the rail 5 is connected thereto through a (normally closed) switch 12. If a fresh electrode 3, which does not as yet participate in the welding operation, be inserted and the switch 12 opened the current no longer flows directly to the electrode 2 but through the electrode 3 and the point of contact between the two electrodes. If the electrode 3 be then arrested by hand or automatically (for example by means of the electromagnet 10 and crank lever 11) the independent advancing of the electrode 2 strikes an arc between the ends to be joined together, which causes these ends to fuse. By releasing the electrode 3 and rapidly advancing the same up to contact with the rear end of the electrode 2, by hand or gravity or spring action, a mechanically and electrically perfect joint is produced. In order to avoid diverting the welder's attention from the welding work more than is absolutely necessary it is of course also possible to initiate the steps necessary for the welding together of the two electrodes, or at least some of these steps, automatically, at the moment the point of contact between the electrodes is in the suitable position, for instance by providing a contact wheel which rotates at a speed depending on that of the advancing of the electrodes.

Having now particularly described and ascertained the nature of my said invention and in what manner the same is to be performed, I declare that what I claim is:

1. The method of interconnecting sections of the covered electrode in automatic electric welding, which consists in welding together the successive electrode sections by means of an arc struck between the ends thereof in series with the main welding circuit.

2. Apparatus for the purpose of welding together successive sections of a covered welding electrode in automatic arc welding, comprising means for advancing the successive electrode sections and means for diverting the electric current of the main welding circuit through said sections.

3. Apparatus for the purpose of welding together successive sections of a concerned welding electrode in automatic arc welding, comprising means for advancing the successive electrode sections, means for arresting and forwarding the electrode section to be joined at any one time and means for diverting the electric current of the main welding circuit through the two sections to be welded.

4. Apparatus for the purpose of welding together successive sections of a concerned welding electrode in automatic arc welding, comprising means for advancing the successive electrode sections, means for arresting and forwarding the electrode section to be joined to the preceding section at any one time means for securing the axial alignment of the electrode sections at the joint and means for diverting the electric current from the main welding circuit through said sections to be welded.

5. Apparatus for the purpose of welding together successive sections of a concerned welding electrode in automatic arc welding, comprising means for advancing the successive electrode sections, means for arresting and forwarding the electrode sections to be joined to the preceding section at any one time, means for securing the axial alignment of the electrode sections at the joint, means for diverting the main welding current alternately through both the electrode sections to be united or directly to the electrode section furnishing the welding arc for the time being.

6. Apparatus for the purpose of welding together successive sections of a concerned welding electrode in automatic arc welding, means for advancing the successive electrode sections, means for arresting and forwarding the electrode section to be joined to the preceding section being welded at the time, means for securing the axial alignment of the electrode sections and for feeding current to said sections, and means for diverting the main welding current alternately through both the electrode sections to be united, or directly to the electrode section furnishing the welding arc for the time being.

7. Apparatus for the purpose of welding together successive sections of a concerned welding electrode in automatic arc welding, comprising means for advancing the successive electrode sections, means for automatically arresting and forwarding the electrode section to be joined to the preceding section being welded at the time, means for securing axial alignment of the electrode sections, means for feeding the main current through both the electrode sections to be united at the time being.

8. Apparatus for the purpose of welding together successive sections of a concerned welding electrode in automatic arc welding comprising means for advancing the successive electrode sections, means for arresting and forwarding the electrode section to be joined to the preceding section being welded at the time, means including feeding elements fitted to the said electrode sections for securing the axial alignment of the electrode sections and for feeding current to the said sections, and means for alternately feeding the welding current through both the electrode sections to be united or directly to the electrode section furnishing the welding arc for the time being, and means for detaching the said feeding elements from the electrode sections.

9. Apparatus for the purpose of welding together successive sections of a concerned welding electrode in automatic arc welding, comprising means for advancing the successive electrode sections before their uniting, elements inserted and welded in between the consecutive ends of the successive electrode sections, means for arresting and forwarding the electrode section to be joined to the preceding one, being welded for the time being, means for securing the axial alignment of the electrode sections and means for alternately feeding the welding arc through the intermediary of both the electrode sections to be united or directly to the electrode section furnishing the welding arc for the time being.

10. Apparatus for the purpose of welding together successive sections of a covered welding electrode having bared ends in automatic arc welding, comprising friction wheels adapted to advance the said electrode sections, and an electro-magnet, a lever controlled by said magnet for arresting an electrode section, means adapted to bring together the said sections after arc striking with the preceding bared end on the covered electrodes, conductor rails, slotted contact elements fitted to the bared end of the electrode and brushing against conductor rails, and a revolving peg wheel adapted to detach the said feeding elements from the electrode after clearing the conductor rails.

GÜNTER ERBER.